(12) United States Patent
Koyama et al.

(10) Patent No.: US 11,597,133 B2
(45) Date of Patent: Mar. 7, 2023

(54) MOLDED ARTICLE EXTRACTING DEVICE

(71) Applicant: NISSEI ASB MACHINE CO., LTD., Nagano (JP)

(72) Inventors: Kouji Koyama, Nagano (JP); Yoshihiko Uehara, Nagano (JP)

(73) Assignee: NISSEI ASB MACHINE CO., LTD., Nagano (JP)

( * ) Notice: Subject to any disclaimer, the term of this patent is extended or adjusted under 35 U.S.C. 154(b) by 263 days.

(21) Appl. No.: 16/642,222

(22) PCT Filed: Aug. 28, 2018

(86) PCT No.: PCT/JP2018/031800
§ 371 (c)(1),
(2) Date: Feb. 26, 2020

(87) PCT Pub. No.: WO2019/044846
PCT Pub. Date: Mar. 7, 2019

(65) Prior Publication Data
US 2020/0353651 A1 Nov. 12, 2020

(30) Foreign Application Priority Data
Aug. 30, 2017 (JP) .............................. JP2017-165923

(51) Int. Cl.
*B29C 49/42* (2006.01)
*B29C 33/44* (2006.01)
(Continued)

(52) U.S. Cl.
CPC ...... *B29C 49/42069* (2022.05); *B29C 33/442* (2013.01); *B29C 49/42* (2013.01);
(Continued)

(58) Field of Classification Search
CPC ........................ B29C 49/4205; B29C 49/421
See application file for complete search history.

(56) References Cited

U.S. PATENT DOCUMENTS 3,770,098 A * 11/1973 Baugnies .............. B29C 49/421
425/537
3,820,932 A * 6/1974 Worthington ......... B29C 49/421
425/806
(Continued)

FOREIGN PATENT DOCUMENTS

CN 202241944 U 5/2012
CN 203228400 U 10/2013
(Continued)

OTHER PUBLICATIONS

Official Communication (ISR-210) issued in International Patent Application No. PCT/JP2018/031800, dated Oct. 9, 2018, along with an English translation thereof.
(Continued)

*Primary Examiner* — Benjamin A Schiffman
(74) *Attorney, Agent, or Firm* — Greenblum & Bernstein, P.L.C.

(57) ABSTRACT

This extracting device 30 is for extracting a small and lightweight molded article 10 from a molding machine 20, and is provided with a first extracting member 40a, a second extracting member 40b, a first drive mechanism 50, and a second drive mechanism 60, wherein the first extracting member 40a and the second extracting member 40b are provided with accommodating portions 41a, 41b for accommodating the molded article 10, and shutter plates 42a, 42b for opening and closing the accommodating portions 41a and 41b.

10 Claims, 8 Drawing Sheets

(51) Int. Cl.
  B65G 47/74   (2006.01)
  B65G 65/16   (2006.01)
  B65G 47/34   (2006.01)
  B65G 65/02   (2006.01)
  B65G 47/90   (2006.01)
  B29C 49/70   (2006.01)

(52) U.S. Cl.
  CPC .... B29C 49/4205 (2013.01); B29C 49/42093 (2022.05); B29C 49/70 (2013.01); B65G 47/34 (2013.01); B65G 47/74 (2013.01); B65G 47/90 (2013.01); B65G 65/02 (2013.01); B65G 65/16 (2013.01); *B29K 2905/02* (2013.01)

(56) References Cited

U.S. PATENT DOCUMENTS

| | | | | |
|---|---|---|---|---|
| 3,910,741 A | * | 10/1975 | Mehnert | B29C 49/70 425/534 |
| 4,507,039 A | * | 3/1985 | Sawa | B29C 49/4205 414/152 |
| 4,834,643 A | * | 5/1989 | Klinedinst | B29C 49/72 425/522 |
| 4,886,443 A | * | 12/1989 | Klinedinst | B29C 49/72 425/537 |
| 5,098,279 A | * | 3/1992 | Effenberger | B29C 31/00 425/534 |
| 5,458,479 A | * | 10/1995 | Minghetti | B29C 49/421 264/509 |
| 6,334,766 B1 | * | 1/2002 | McCormick | B29C 49/72 425/537 |
| 9,446,552 B2 | * | 9/2016 | Yamaguchi | B29C 49/06 |
| 2012/0003349 A1 | * | 1/2012 | Woinski | B65G 47/901 425/537 |
| 2014/0232045 A1 | * | 8/2014 | Winzinger | B29C 49/421 425/145 |
| 2015/0231816 A1 | | 8/2015 | Yamaguchi et al. | |
| 2019/0039278 A1 | * | 2/2019 | Nagata | B29C 49/2408 |

FOREIGN PATENT DOCUMENTS

| | | |
|---|---|---|
| CN | 104540659 A | 4/2015 |
| JP | 8-238666 | 9/1996 |
| JP | 2002-361723 | 12/2002 |
| JP | 2005-335360 A | 12/2005 |
| JP | 2008-62955 | 3/2008 |

OTHER PUBLICATIONS

Official Communication (IPRP-237) issued in International Patent Application No. PCT/JP2018/031800, dated Oct. 9, 2018.

Office Action issued in corresponding Chinese Patent Application No. 201880068350.8 dated Jun. 3, 2021, along with English translation thereof.

* cited by examiner

[FIG.1]
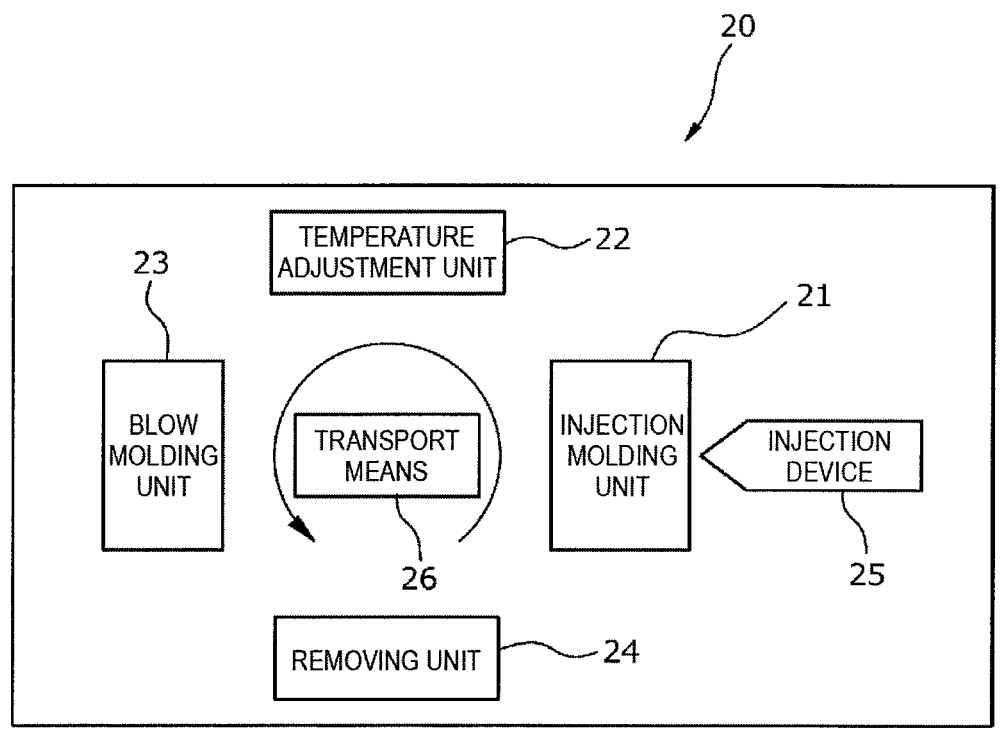

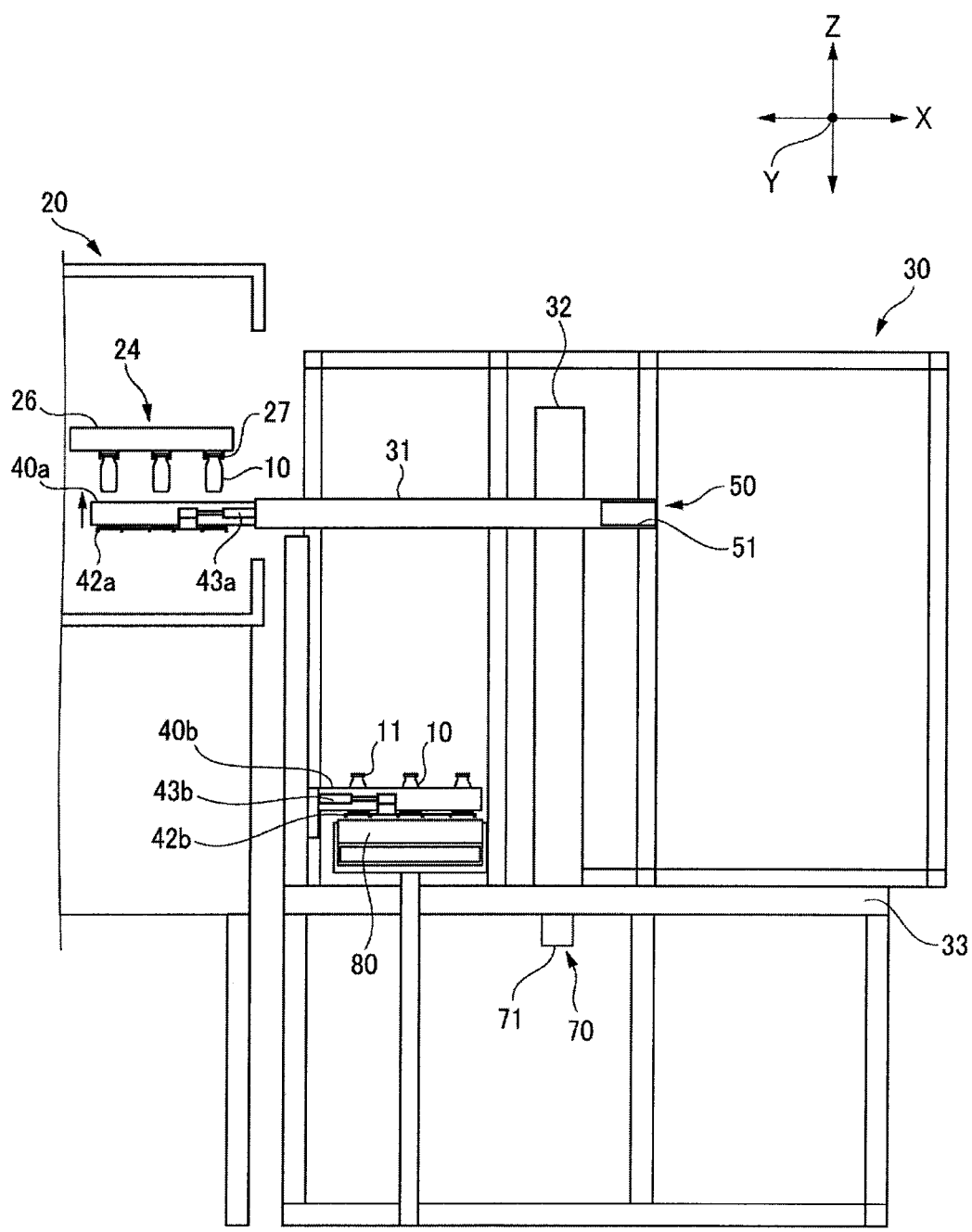
[FIG.2]

[FIG.3]
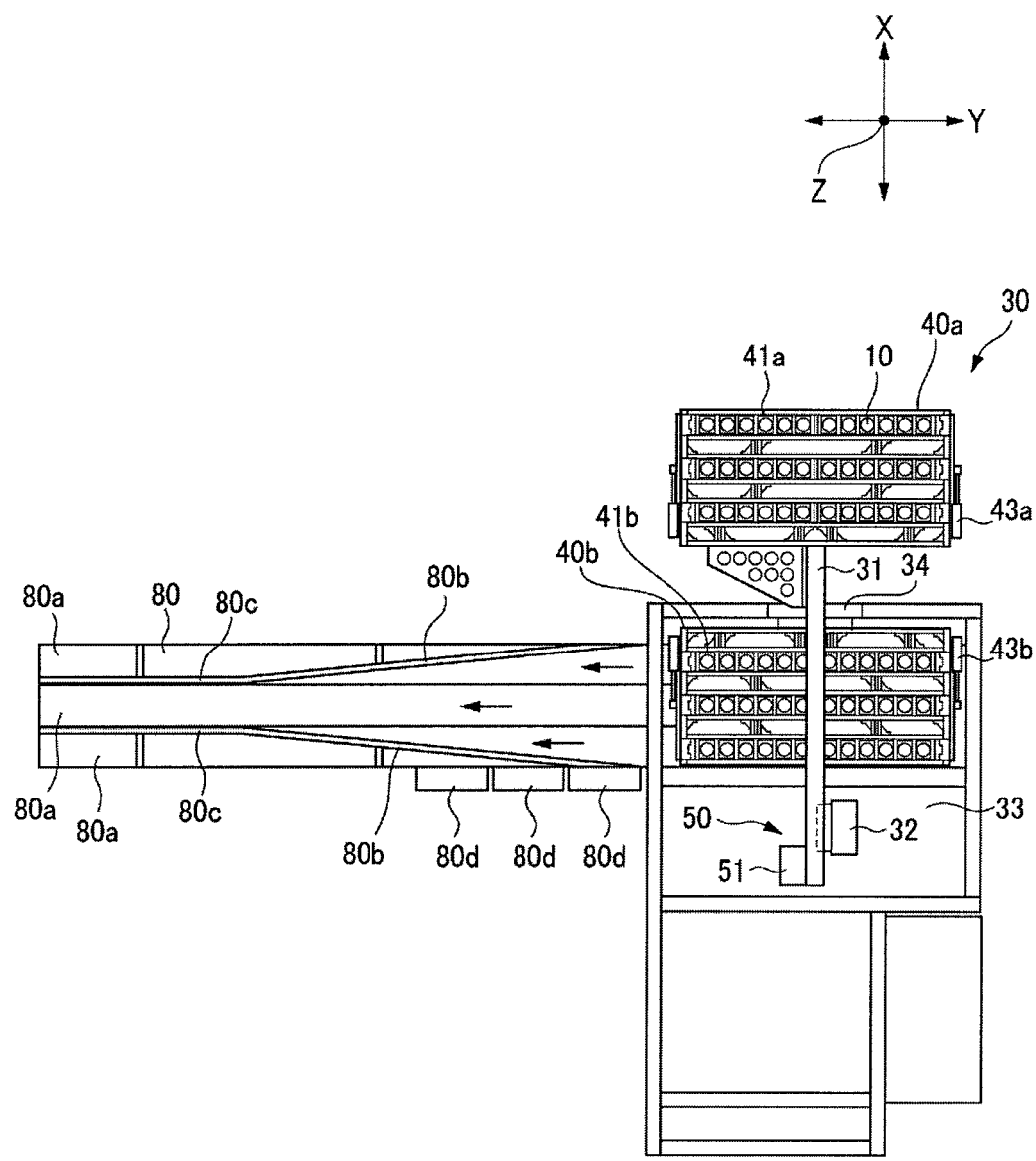

[FIG.4]
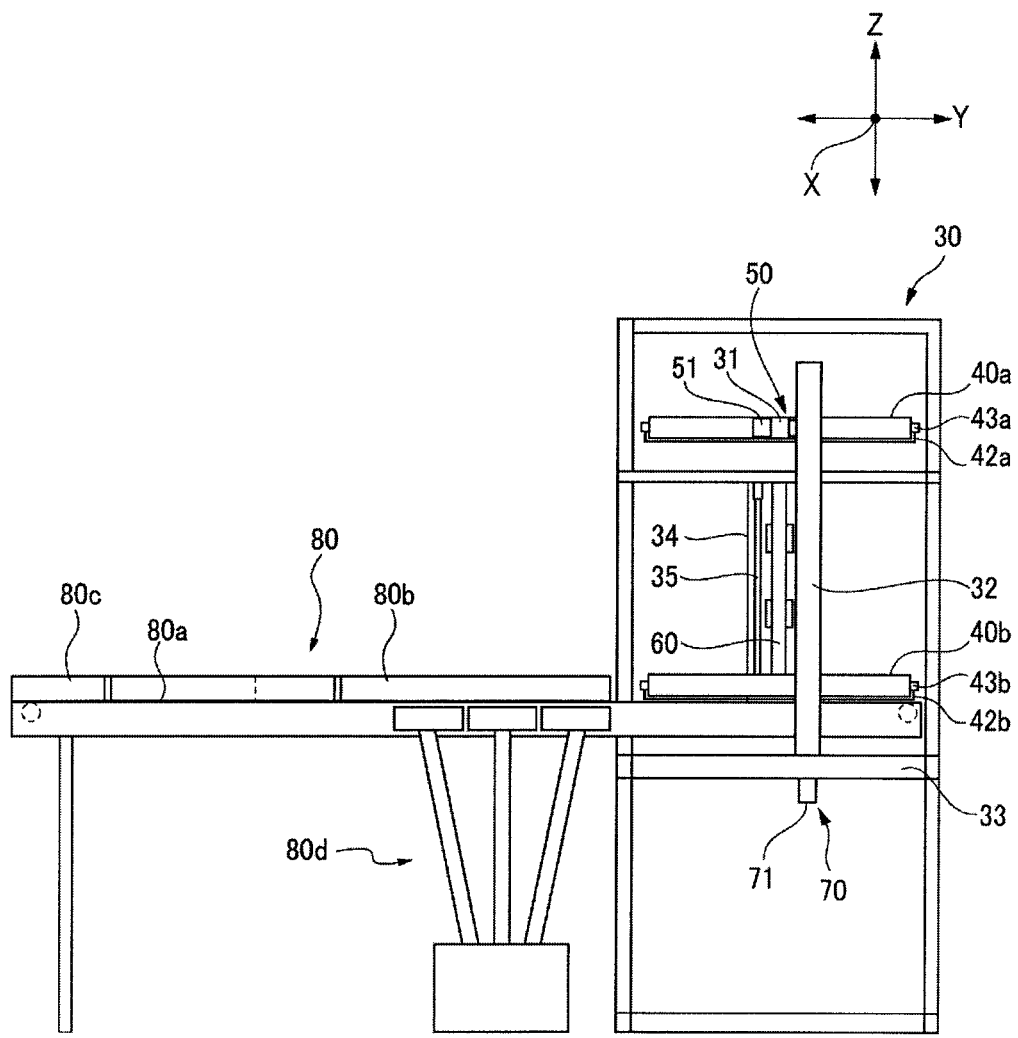

[FIG.5]
(a)
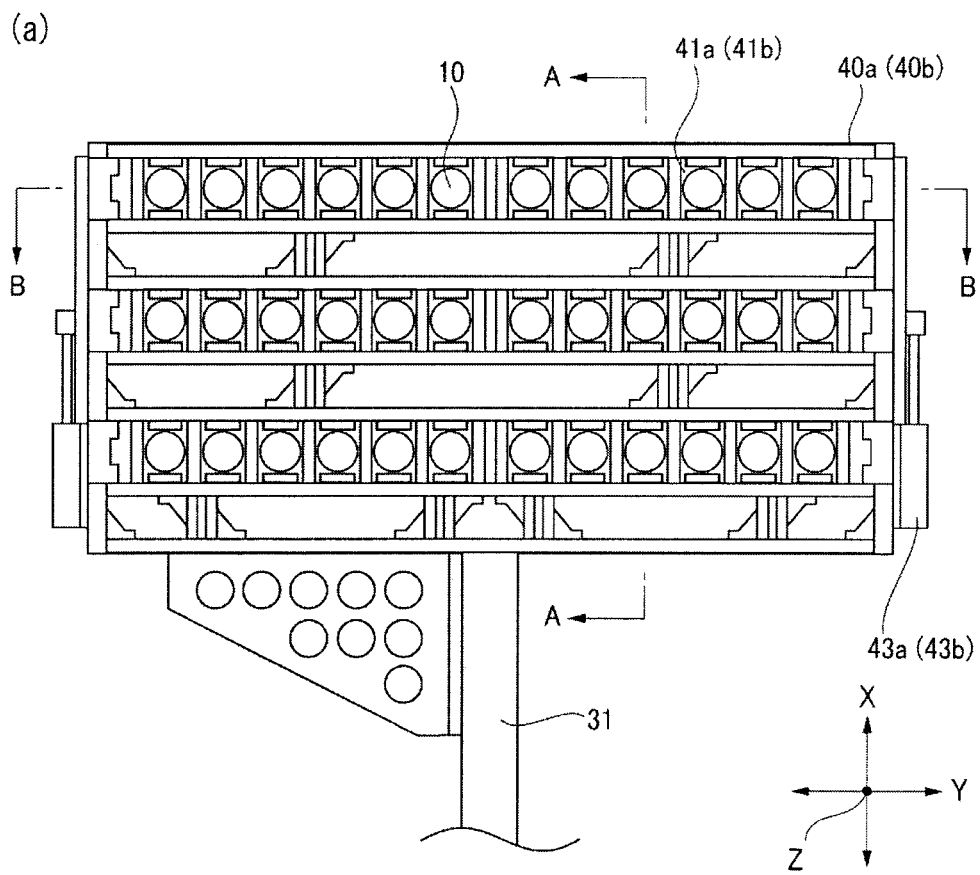
[FIG. 5]
(b)
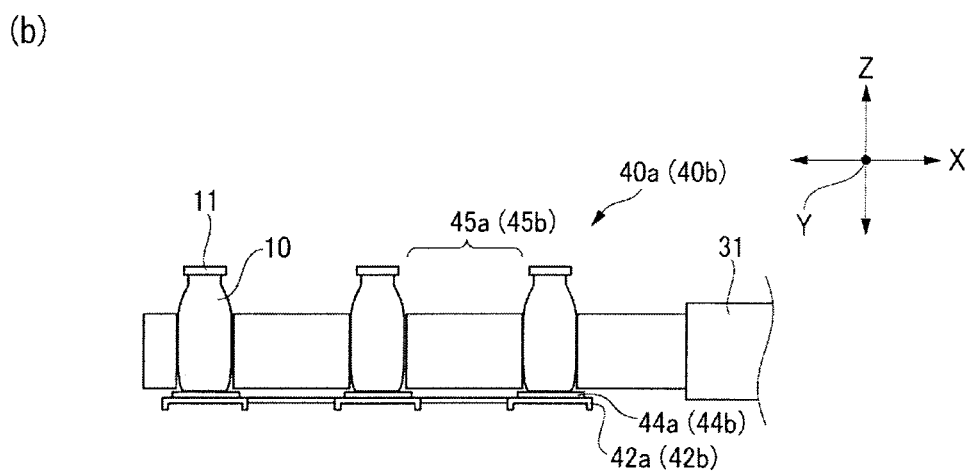

[FIG.6]
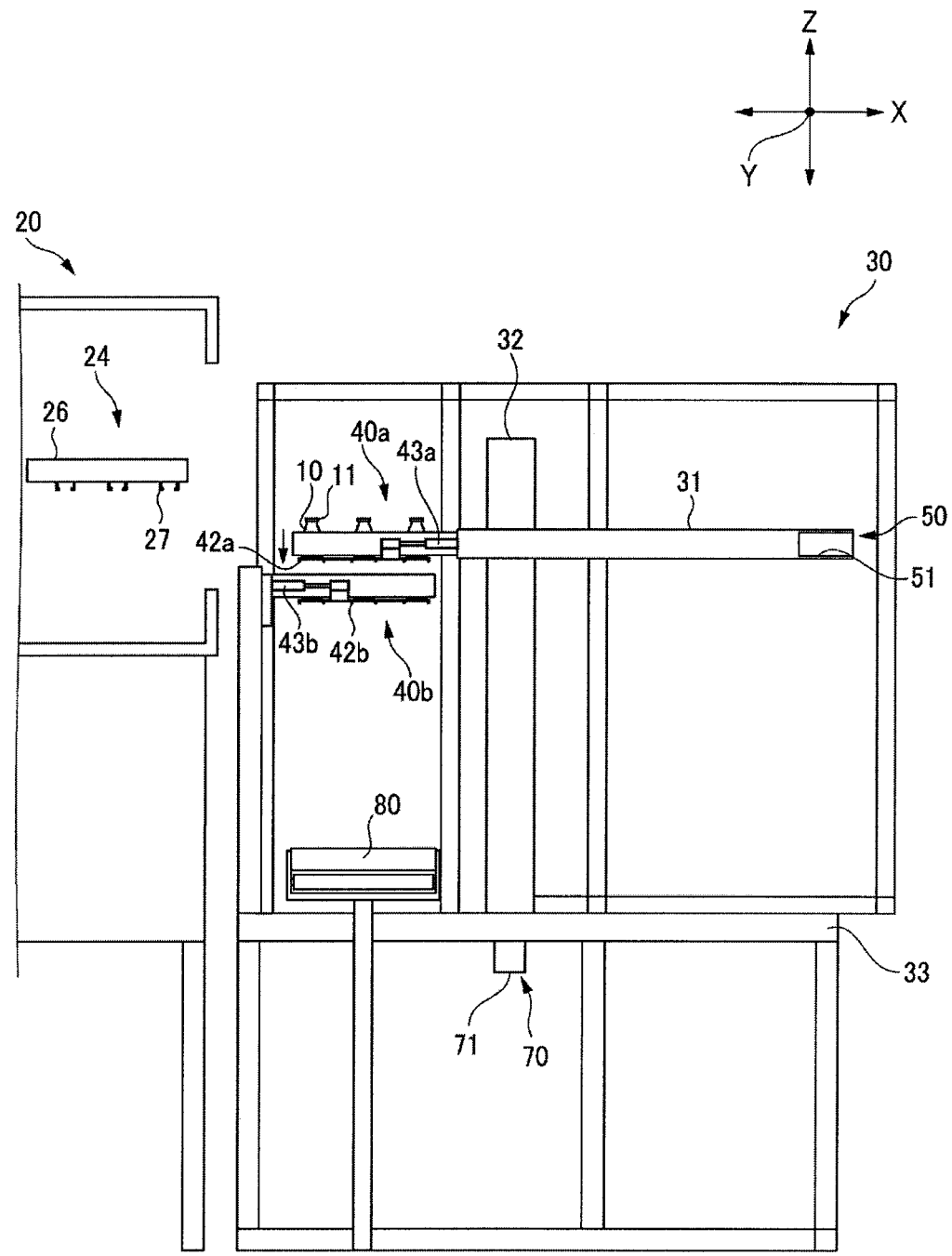

[FIG.7]
(a)
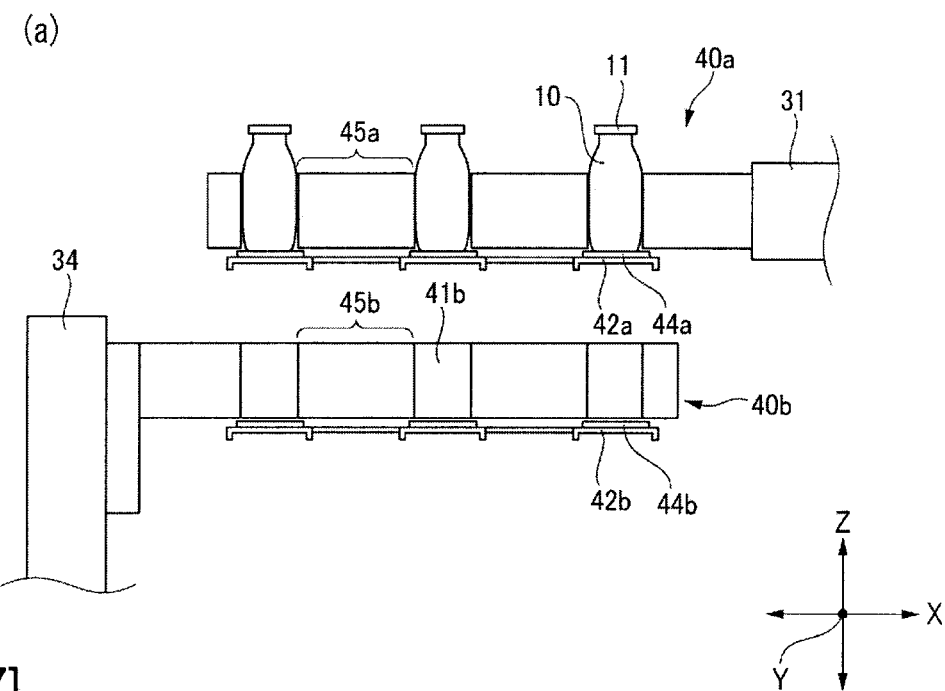
[FIG.7]
(b)
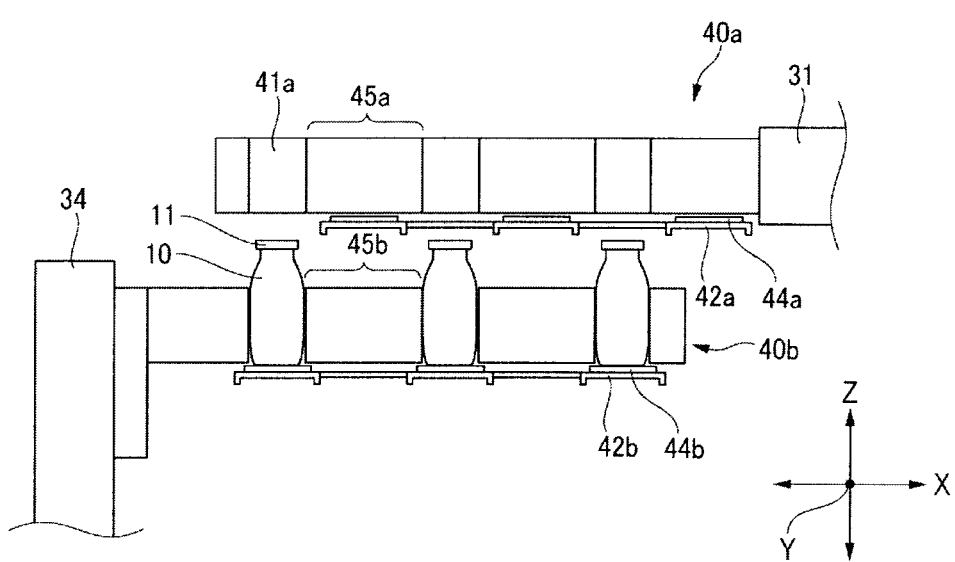

[FIG.8]
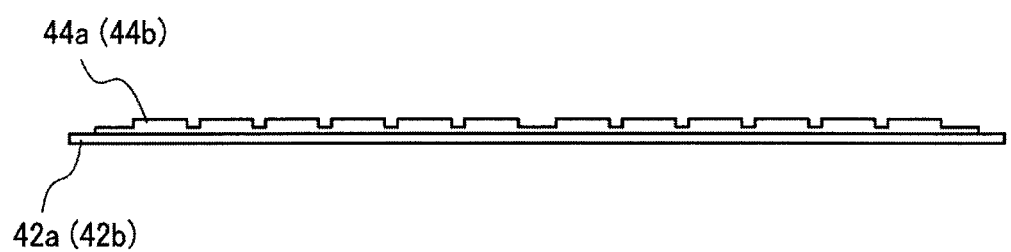

MOLDED ARTICLE EXTRACTING DEVICE

BACKGROUND OF THE INVENTION

(1) Field of the Invention

The invention relates to a molded article removing device.

(2) Description of Related Art Including Information Disclosed Under 37 C.F.R. 1.97 and 1.98

An injection stretch blow molding (ISBM) machine for a resin container includes a removing unit for removing a molded article (container) molded by blowing a preform. The molded article removed from the removing unit is transported to a post-process for inspection, packing, filling or the like. PTL 1 discloses an injection stretch blow molding machine which includes an article removing unit and in which the article removing unit includes an article transport means.

PTL 1: JP-A-Hei-8-238666

BRIEF SUMMARY OF INVENTION

In recent years, the productivity of a molding machine (such as an injection stretch blow molding machine (ISBM)) for a resin container has been further improved. Further, the molding cycle time is becoming shorter, and the number of molded articles that can be produced per one cycle also tends to increase. As a means for removing a molded article from a molding machine, a method using a removing shooter for removing molded articles without alignment can be employed. In this method, it is necessary to align the molded articles when transporting the molded articles to a post-process, which increases a labor of an operator. Further, in the removing shooter, the molded articles are liable to be damaged, and thus, there is a problem when handing a molded article in which appearance is important.

In order to align and remove the containers, a removing device is used instead of the removing shooter. However, when trying to align and remove the containers from a molding machine capable of forming large quantities of molded articles at high speed, the removing operation needs to be performed quickly and accurately.

The invention aims to provide a molded article removing device capable of removing a lot of molded articles from a molding machine in a short time.

A molded article removing device of the present invention capable of solving the above-mentioned problems is a molded article removing device for removing a small and lightweight molded article from a molding machine, the molded article removing device including:
  a first removing member configured to receive the molded article from a removing unit of the molding machine;
  a second removing member configured to receive the molded article from the first removing member;
  a first drive mechanism configured to move the first removing member in a horizontal direction; and
  a second drive mechanism configured to move the second removing member in a vertical direction,
  in which each of the first removing member and the second removing member includes:
    an accommodating portion configured to accommodate the molded article; and
    a shutter plate configured to slide in the horizontal direction to open and close the accommodating portion,
  in which the molded article is accommodated in the accommodating portion in a state where the accommodating portion is closed, and
  in which the molded article is configured to be dropped from the accommodating portion by opening the accommodating portion.

According to the above configuration, the operation of removing the molded article is divided by the first removing member and the second removing member. In this way, a lot of molded articles can be removed from the molding machine in a short time.

In the molded article removing device of the present invention, it is preferable that the shutter plate is provided with a buffer on a surface receiving the molded article.

According to the above configuration, the elastic repulsion between the shutter plate and the molded article can be reduced by the buffer, and the molded article can be accommodated in a normal posture in the accommodating portion.

In the molded article removing device of the present invention, it is preferable that the first removing member and the second removing member are made of aluminum steel materials.

According to the above configuration, the removing members are made of aluminum steel materials. In this way, the weights of the removing members can be reduced, and vibration of the removing members due to a high-speed operation can be prevented.

In the molded article removing device of the present invention, it is preferable that the molded article removing device includes a third drive mechanism configured to move the first removing member in the vertical direction, and the third drive mechanism moves the first removing member upward in the vertical direction so as to bring the first removing member toward the molding machine when the first removing member receives the molded article from the removing unit of the molding machine.

In the molded article removing device of the present invention, it is preferable that the molded article removing device includes a third drive mechanism configured to move the first removing member in the vertical direction, and the third drive mechanism moves the first removing member downward in the vertical direction so as to bring the first removing member toward the second removing member when the first removing member transfers the molded article to the second removing member.

According to the invention, it is possible to provide a molded article removing device capable of removing a lot of molded articles from a molding machine in a short time.

BRIEF DESCRIPTION OF THE SEVERAL VIEWS OF THE DRAWING(S)

FIG. 1 is a block diagram of a molding machine according an embodiment.

FIG. 2 is a schematic front view of a molded article removing device according to the embodiment.

FIG. 3 is a schematic plan view of the molded article removing device according to the embodiment.

FIG. 4 is a schematic side view of the molded article removing device according to the embodiment.

FIG. 5(a) and FIG. 5(b) are schematic views of a first removing member according to the embodiment. FIG. 5(a) is a schematic plan view and FIG. 5(b) is a schematic sectional view taken along the line A-A in FIG. 5(a).

FIG. 6 is a schematic front view of the molded article removing device according to the embodiment.

FIG. 7(a) and FIG. 7(b) are schematic diagrams showing a state in which a molded article is moved from a first removing member to a second removing member. FIG. 7(a) shows a state in which the molded article is accommodated in the first removing member, and FIG. 7(b) shows a state in which the molded article is moved from the first removing member to the second removing member.

FIG. 8 is a schematic sectional view taken along the line B-B in FIG. 5(a) (a view showing a shutter plate and a buffer).

DETAILED DESCRIPTION OF THE INVENTION

Hereinafter, an example of an embodiment of the invention will be described with reference to the drawings. Here, the dimensions of each member shown in these drawings may be different from the actual dimensions of each member for convenience of explanation. First, a molding machine 20 for producing a molded article 10 will be described with reference to FIG. 1. FIG. 1 is a block diagram of the molding machine 20.

As shown in FIG. 1, the molding machine 20 includes an injection molding unit 21 for producing a preform, and a temperature adjustment unit 22 for adjusting the temperature of the produced preform. An injection device 25 for supplying a resin material as a raw material is connected to the injection molding unit 21. Further, the molding machine 20 includes a blow molding unit (an example of a blowing device) 23 for producing the molded article 10 by blowing a preform, and a removing unit 24 for removing the produced molded article 10.

The injection molding unit 21, the temperature adjustment unit 22, the blow molding unit 23, and the removing unit 24 are provided at positions rotated by a predetermined angle (90 degrees in this embodiment) about a transport means 26. The transport means 26 is configured by a rotating plate, for example. The transport means 26 is configured such that the molded article 10 in a state where a neck portion 11 is supported by a neck mold 27 attached to the rotating plate is transported to each unit as the rotating plate rotates.

The injection molding unit 21 includes an injection cavity mold, an injection core mold, a neck mold, and the like (not shown). A bottomed preform is produced by pouring a resin material from the injection device 25 into a preform-shaped space formed by clamping these molds.

The temperature adjustment unit 22 is configured to heat and adjust the temperature of the preform produced by the injection molding unit 21 to a temperature suitable for stretch blowing. Further, the configuration of the temperature adjustment unit 22 may be any of a temperature adjustment pot type, an infrared heater type, a RED type, and an electromagnetic wave heating type.

The blow molding unit 23 is configured to perform a final blowing, using a mold formed of a split mold, on the preform, the temperature of which has been adjusted by the temperature adjustment unit 22, thereby producing a resin container.

The removing unit 24 is configured to release the neck portion 11 of the molded article 10 produced by the blow molding unit 23 from the neck mold 27, thereby removing the molded article 10.

The molding machine 20 of the present embodiment completes one molding process at a high speed of, for example, 6.4 to 6.5 seconds to produce the molded article 10. This one molding process refers to, for example, a process in which the molded article 10 is transported from the blow molding unit 23 to the removing unit 24 and the neck portion 11 of the molded article 10 is released from the neck mold 27 and immediately before the neck mold 27 is moved to the injection molding unit 21. The time generally corresponds to an interval at which the rotating plate rotates intermittently. The molded article 10 to be produced is a small and lightweight resin container having a capacity of, for example, 150 mL or less and a weight of, for example, 6 g or less.

Subsequently, a removing device 30 for the molded article 10 that removes the molded article 10 from the removing unit 24 of the molding machine 20 will be described with reference to FIGS. 2 to 4. FIG. 2 is a schematic front view of the removing device 30, FIG. 3 is a schematic plan view of the removing device 30, and FIG. 4 is a schematic side view of the removing device 30. Meanwhile, the X direction in the drawings indicates the left and right direction, the Y direction indicates the front and rear direction, and the Z direction indicates the upper and lower (vertical) direction. Further, the left and right, front and rear, and upper and lower directions (to be described later) are defined based on the direction in FIG. 2.

The removing device 30 includes a first removing member 40a, a second removing member 40b provided below the first removing member 40a, a moving member 31 extending in the left and right direction, a first support member 32 extending in the upper and lower direction, a pedestal 33, a second support member 34 extending in the vertical direction, a first drive mechanism 50, a second drive mechanism 60, and a third drive mechanism 70.

The first removing member 40a is connected to the moving member 31. Further, the moving member 31 is connected to the first support member 32. The first support member 32 is fixed to the pedestal 33. The first removing member 40a is supported by the first support member 32 and the moving member 31 at a height at which the first removing member 40a is movable to the removing unit 24 of the molding machine 20 in the left and right direction.

The first drive mechanism 50 moves the first removing member 40a in the left and right direction. The first drive mechanism 50 includes a first electric motor 51, a first ball nut, and a first ball screw shaft. The first electric motor 51 is a servo motor provided at an end portion of the moving member 31. The first ball nut is accommodated in the moving member 31 and fixed to the first support member 32. The first ball screw shaft is accommodated in the moving member 31. The first ball screw shaft is screwed to the first ball nut 52 and rotated by the first electric motor 51. A pulley is provided at an end portion of the first ball screw shaft. A belt is wound around the pulley and an output pulley of the first electric motor 51.

The third drive mechanism 70 moves the first removing member 40a in the upper and lower direction. The third drive mechanism 70 includes a second electric motor 71, a second ball nut, and a second ball screw shaft. The second electric motor 71 is a servo motor provided at a lower end portion of the first support member 32. The second ball nut is fixed to the first support member 32 so as to be able to move up and down. The second ball screw shaft is accommodated in the first support member 32. The second ball screw shaft is screwed to the second ball nut 72 and connected to the second electric motor 71 to rotate.

The second removing member 40b is connected to the second drive mechanism 60 for moving the second removing member 40b in the upper and lower direction. The second drive mechanism 60 is an air cylinder or an electric motor. The second drive mechanism 60 is provided to the second support member 34. The second support member 34 is fixed to the pedestal 33. The second support member 34 includes a guide rail 35 for guiding the second removing member 40b.

Now, the first removing member 40a and the second removing member 40b will be described with reference to FIG. 5. FIG. 5 is a schematic view of the first removing member 40a. Part (a) of FIG. 5 is a schematic plan view, and part (b) of FIG. 5 is a schematic sectional view taken along the line A-A in part (a) of FIG. 5. Meanwhile, since the second removing member 40b has the same configuration as the first removing member 40a, detailed representation is omitted and FIG. 5 shows only corresponding reference numerals.

The first removing member 40a and the second removing member 40b include accommodating portions 41a, 41b for accommodating the molded article 10, shutter plates 42a, 42b provided at the bottoms of the first removing member 40a and the second removing member 40b, and fourth drive mechanisms 43a, 43b provided at the sides of the first removing member 40a and the second removing member 40b. Further, the first removing member 40a and the second removing member 40b are formed of aluminum steel. The accommodating portions 41a, 41b are provided in a plurality of rows (e.g., three rows) in the left and right direction and in a plurality of rows (e.g., twelve rows) in the front and rear direction (thirty six in total). The accommodating portions 41a, 41b are formed to have a width that is larger than the width of the molded article 10 by about 1 mm to 10 mm in the left and right direction and the front and rear direction. That is, the accommodating portions 41a, 41b extending in the front and rear direction form one accommodating portion group body. A plurality of (e.g., three) accommodating portion group bodies are connected to each other in the left and right direction with a gap therebetween by a plate-like member or an outer frame member provided to the outside. Here, a reinforcing member is provided in the gap portion as required. Meanwhile, considering the object of removing the molded article 10 from the molding machine 20 at high speed and in large quantities, it is desirable that the accommodating portions 41a, 41b are provided at least in three or more rows in the X direction.

The shutter plates 42a, 42b are connected to the fourth drive mechanisms 43a, 43b. The fourth drive mechanisms 43a, 43b are air cylinders or electric motors and slide the shutter plates 42a, 42b in the left and right direction to open and close the bottoms of the accommodating portions 41a, 41b. Storage portions 45a, 45b are provided between the rows of the accommodating portions 41a, 41b in the left and right direction so that the shutter plates 42a, 42b can be stored when the bottoms of the accommodating portions 41a, 41b are opened. The storage portions 45a, 45b are portions corresponding to the gaps described above. The shutter plates 42a, 42b are provided with buffers 44a, 44b on upper surfaces thereof (the surfaces receiving the molded article 10 from the molding machine 20). The buffers 44a, 44b are laminates having first resin materials and second resin materials on the first resin materials. The first resin material is a resin material having a high buffer property, and the second resin material is a resin material having a high durability. Meanwhile, the surfaces (contact surfaces with the bottom of the molded article 10) of the buffers 44a, 44b are formed of a resin material having a high sliding property. Furthermore, as shown in FIG. 8, it is desirable that the surfaces are subjected to embossing. FIG. 8 is a schematic sectional view taken along the line B-B in part (a) of FIG. 5 (a view showing the shutter plates and the buffers). In this way, the frictional force between the bottom of the molded article 10 and the buffers 44a, 44b is reduced when the shutter plates 42a, 42b are slid. Therefore, the molded article 10 can be more reliably transferred to the downstream process in its normal posture.

Subsequently, a method of removing the molded article 10 using the removing device 30 will be described. First, as shown in FIG. 2, the first removing member 40a is moved leftward by the first drive mechanism 50 and placed in the removing unit 24 of the molding machine 20. Then, the first removing member 40a is moved upward by the third drive mechanism 70 and approaches the neck mold 27 of the molding machine 20. When the first removing member 40a approaches the neck mold 27, the neck portion 11 of the molded article 10 is released from the neck mold 27, and the molded article 10 is dropped and accommodated in the accommodating portion 41a. At this time, the bottom of the accommodating portion 41a of the first removing member 40a is closed by the shutter plate 42a of the first removing member 40a.

Subsequently, the first removing member 40a accommodating the molded article 10 is moved downward by the third drive mechanism 70 and placed away from the neck mold 27. Then, as shown in FIG. 6, the first removing member 40a is moved rightward by the first drive mechanism 50 so as to be disposed above the second removing member 40b. Then, the first removing member 40a is moved downward by the third drive mechanism 70 so as to approach the second removing member 40b. At this time, the second removing member 40b is moved upward by the second drive mechanism 60 and placed on the upper side.

Subsequently, the transport of the molded article 10 from the first removing member 40a to the second removing member 40b will be described with reference to FIG. 7. FIG. 7 is a schematic diagram showing a state in which the molded article is moved from the first removing member to the second removing member. Part (a) of FIG. 7 shows a state in which the molded article is accommodated in the first removing member, and part (b) of FIG. 7 shows a state in which the molded article is moved from first removing member to the second removing member. As shown in FIG. 7, when the first removing member 40a and the second removing member 40b are located closest (part (a) of FIG. 7), the shutter plate 42a of the first removing member 40a is slid in a horizontal direction, and the bottom of the accommodating portion 41a of the first removing member 40a is opened. In this way, the molded article 10 is dropped and accommodated in the accommodating portion 41b of the second removing member 40b (part (b) of FIG. 7). At this time, the bottom of the accommodating portion 41b of the second removing member 40b is closed by the shutter plate 42b of the second removing member 40b. After the molded article 10 is accommodated in the second removing member 40b, the bottom of the accommodating portion 41a of the first removing member 40a is closed.

After the molded article 10 is moved from the first removing member 40a to the second removing member 40b, as shown in FIG. 2, the second removing member 40b is moved downward by the second drive mechanism so as to approach a transport device 80 arranged separately from the removing device 30. In the present embodiment, the transport device 80 is a transport conveyor belt (see FIGS. 2 to 4). When the second removing member 40b and the transport device 80 are located closest, the shutter plate 42b of the second removing member 40b is slid in the horizontal direction, and the bottom of the accommodating portion 41b of the second removing member 40b is opened. In this way, the molded article 10 is dropped and lands on the transport device 80. After the molded article 10 lands on the transport device 80, the second removing member 40b is moved upward by the second drive mechanism 60 and approaches the first removing member 40a again. On the way, the bottom of the accommodating portion 41b of the second removing member 40b is closed. When the second removing member 40b rises and the molded article 10 is released, the molded article 10 is transported by the transport device 80 and sent to the next process such as inspecting or packing, and the removing of the molded article 10 is completed.

While the second removing member 40b approaches the transport device 80, and the molded article 10 lands on the transport device 80 and is moved upward again, the first removing member 40a is moved leftward by the first drive mechanism 50 and placed in the removing unit 24 of the molding machine 20, as shown in FIG. 2. The molded article 10 is accommodated in the accommodating portion 41a and moved rightward so as to approach the second removing member 40b again, as shown in FIG. 6. With this method, the removing of the molded article 10 is continuously performed.

Meanwhile, it is desirable that the transport device 80 aligns a plurality of rows of molded articles 10 in a single row and transports the plurality of rows of molded articles 10 to the next process. In order to perform this, the transport device 80 includes a plurality of rows of transport conveyors 80a, inclined guides 80b, parallel guides 80c, and vacuum mechanisms 80d (see FIGS. 3 and 4). The transport conveyors 80a have the same number as the number of rows of the accommodating portions 41a, 41b of each of the first removing member 40a and the second removing member 40b of the removing device 30 and are set to be operable independently for each row. From the upstream position of the transport device 80 on which the molded article 10 from the removing device 30 lands to the downstream position closer to the next process, the inclined guides 80b extend from the outer transport conveyors 80a to the central transport conveyor 80a with an inclination. The number of the inclined guides 80b may be at least two, and may be a number obtained by subtracting one from the number of rows of the accommodating portions 41a, 41b of each of the first removing member 40a and the second removing member 40b of the removing device 30. The parallel guides 80c extend substantially parallel to the central transport conveyor 80a, and the number of the parallel guides 80c may be at least two. The inclined guides 80b are installed and fixed in a state of being separated from and contacted with the upper surfaces of the transport conveyors 80a in the Z direction. Further, the inclined guides 80b and the parallel guides 80c may have a flat-plate shape or a rod shape. Meanwhile, FIGS. 3 and 4 show an example in which the number of each of the inclined guides 80b and the parallel guides 80c is set to two. The vacuum mechanisms 80d are mechanisms for preventing the molded articles 10 from falling down during transportation, and hold the bottoms of the molded articles 10 by suction of air through many openings formed on the surfaces of the transport conveyors 80a.

Here, an operation of aligning the molded articles 10 by the transport device 80 will be described with reference to FIG. 3. First, when a plurality of rows of molded articles 10 from the removing device 30 land on the surfaces of the transport conveyors 80a, the vacuum mechanisms 80d hold the molded articles 10. Subsequently, the central transport conveyor 80a is operated, and the molded articles 10 in the central row are transported for a predetermined distance (predetermined time) to enter between the parallel guides 80c. Thereafter, the transport conveyor 80a in one of the outer rows is operated, and the molded articles 10 held on the surface thereof are transported for a predetermined distance (predetermined time). At this time, the molded articles 10 in the outer rows are transported toward the central transport conveyor 80a while being in contact with the inclined guides 80b, and proceed to enter between the parallel guides 80c. Finally, the transport conveyor 80a in the other of the outer rows is operated, and the molded articles are transported toward the space between the parallel guides 80c while contacting the inclined guides 80b. Meanwhile, the vacuum mechanisms 80d may be operated at all times, or may be operated only for a predetermined time from the landing of the molded articles 10. In this way, the transport conveyors 80a in a plurality of rows are operated stepwise (at different timings), and the molded articles 10 in the outer rows are merged with the molded articles 10 in the central row along the inclined guides 80b, so that the molded articles 10 arranged in at least three rows can be easily aligned in a single row.

By the way, the molding capacity of a molding machine has been improved so that small and lightweight molded articles can be molded in large quantities and at high speed. Therefore, the molded article removing device is also required to be able to align and remove the molded articles in accordance with the molding capacity of the molding machine. Further, since the removing unit of the molding machine is arranged at a position higher than the height at which a post-process such as inspection and packing is performed for convenience of molding, an operation of lowering the molded articles is required.

According to the removing device 30 of the present embodiment, the removing member is divided into the first removing member 40a and the second removing member 40b. Therefore, from the time when the second removing member 40b receives the molded article 10 from the first removing member 40a to the time when the second removing member 40b transfers the molded article 10 to the transport device 80, the first removing member 40a can return toward the molding machine 20 and receive the molded article 10. In this way, since one removing member can perform the receiving operation while the other removing member performs the operation of transferring the molded article 10, it is possible to remove more molded articles 10 in a short time.

Furthermore, since the operations of the first removing member 40a and the second removing member 40b are simplified, the reliability of the operation of the removing device 30 is improved.

Further, when the molded article 10 is dropped on the first removing member 40a from the removing unit 24 of the molding machine 20, and when the molded article 10 is dropped on the second removing member 40b from the first removing member 40a, there is a possibility that the molded article 10 bounces and is misaligned. In particular, in the removing device 30 that operates at high speed, even if the molded article 10 is misaligned for a short time, there is a possibility that the molded article 10 comes into contact with the neck mold 27 when the first removing member 40a shifts from the receiving operation to the transfer operation, and there is a possibility that the molded article 10 dropped on the accommodating portion 41b of the second removing member 40b comes into contact with the first removing member 40a when the first removing member 40a shifts from the transfer operation to the receiving operation. Further, the small and lightweight molded article 10 is liable to bounce. Further, since the neck portion 11 of the molded article 10 is heavier than the body portion of the molded article 10, the center of gravity is located above, and thus the balance is liable to be broken. In the removing device 30 of the embodiment, the buffers 44a, 44b are provided on the surfaces, which receive the molded article 10, of the shutter plates 42a, 42b. Therefore, it is possible to effectively prevent the small and lightweight molded article 10 from bouncing or being misaligned, and to remove the molded article 10 at high speed.

Further, in the removing device used for the molding machine that can mold a large amount of molded articles in one cycle, the removing member becomes large. Therefore, the removing member is made of steel or the like, or a digging type resin material is provided in the accommodating portion. In this case, the removing member becomes heavy. Accordingly, large inertia acts on the removing member during a sudden stop in a high-speed operation, and the removing member vibrates. Due to this vibration, the removing operation may not be performed smoothly. On the contrary, in the removing device 30 of the present embodiment, the first removing member 40a and the second removing member 40b are made of aluminum steel materials, and many gaps are formed therebetween. Therefore, the first removing member 40a and the second removing member 40b are lightweight, and inertia acting on these removing members during a sudden stop is reduced. In this way, vibration during a sudden stop can be effectively prevented, and a large amount of molded articles 10 can be removed at high speed.

Meanwhile, the invention is not limited to the above-described embodiments, and can be freely modified and improved as appropriate. In addition, materials, shapes, dimensions, numerical values, forms, numbers, and locations and the like of each component in the above-described embodiments are arbitrary and not limited, so long as the invention can be achieved.

For example, in the above embodiment, the accommodating portions 41a, 41b of the first removing member 40a and the second removing member 40b have been described with a specific number. However, the number of the accommodating portions 41a, 41b applicable to the removing device 30 is not particularly limited. The number of the accommodating portions 41a, 41b can be appropriately changed according to the producing capacity of the molding machine 20. Further, in the above embodiment, the molding machine 20 that completes one molding process at a specific speed has been described. However, the molding speed of the molding machine applicable to the removing device 30 is not particularly limited.

Further, in the above embodiment, the capacity and weight of the molded article have been described, but this description is not intended to limit the present invention. For example, the small and lightweight molded article may have a capacity of 50 mL to 300 mL and a weight of 3.0 g to 15.0 g.

Further, in the above embodiment, the first drive mechanism 50, the second drive mechanism 60, and the fourth drive mechanisms 43a, 43b have been described in a specific form. However, any form of mechanisms may be used as the first drive mechanism 50, the second drive mechanism 60, and the fourth drive mechanisms 43a, 43b, so long as they can move the first removing member 40a in the horizontal direction, can move the second removing member 40b in the vertical direction, and can move the shutter plates 42a, 42b in the horizontal direction.

Further, in the above embodiment, the removing device 30 provided with the third drive mechanism 70 has been described. However, the effects of the present invention can be obtained even if the third drive mechanism 70 is not provided. However, when the third drive mechanism 70 is provided, the first removing member 40a can be further closer to the neck mold 27 and the second removing member 40b when transporting the molded article 10, and the molded article 10 can be accurately transported in a shorter time, which is preferable.

Further, in the above embodiment, the laminate having the first resin material and the second resin material on the first resin material has been described as the buffers 44a, 44b. However, the present invention is not particularly limited thereto. The effects of the present invention can be obtained, so long as the material having a buffer property is used. However, when the surfaces of the buffers 44a, 44b are made of a highly durable material, the damage due to friction generated by the shutter plates 42a, 42b can be effectively prevented, which is preferable.

Meanwhile, this application is based on Japanese Patent Application No. 2017-165923 filed on Aug. 30, 2017, which is incorporated by reference in its entirety. Further, all references cited herein are incorporated in their entirety.

10: Molded article, 11: Neck portion, 20: Molding machine, 21: Injection molding unit, 22: Temperature adjustment unit, 23: Blow molding unit, 24: Removing unit, 25: Injection device, 26: Transport means, 27: Neck mold, 30: Removing device, 31: Moving member, 32: First support member, 33: Pedestal, 34: Second support member, 35: Guide rail, 40a: First removing member, 40b: Second removing member, 41a, 41b: Accommodating portion, 42a, 42b: Shutter plate, 43a, 43b: Fourth drive mechanism, 44a, 44b: Buffer, 45a, 45b: Storage portion, 50: First drive mechanism, 51: First electric motor, 60: Second drive mechanism, 70: Third drive mechanism, 71: Second electric motor, 80: Transport device

The invention claimed is:

1. A molded article removing device for removing a plurality of small and lightweight molded articles from a molding machine, the molded article removing device comprising:
   a first removing member configured to receive the plurality of molded articles from a removing unit of the molding machine;
   a second removing member configured to receive the plurality of molded articles from the first removing member;
   a first drive mechanism configured to move the first removing member in a horizontal direction; and
   a second drive mechanism configured to move the second removing member in a vertical direction,
      wherein each of the first removing member and the second removing member includes:
      an accommodating portion configured to accommodate the plurality of molded articles in at least three rows in the horizontal direction; and
      a shutter plate configured to slide in the horizontal direction to open and close the accommodating portion,
   wherein the plurality of molded articles are accommodated in the accommodating portion in a state where the accommodating portion is closed, and wherein the plurality of molded articles are configured to be dropped from the accommodating portion by opening the accommodating portion, and wherein each of the at least three rows in the accommodating portion are configured to accommodate a plurality of molded articles.

2. The molded article removing device according to claim 1, wherein the shutter plate is provided with a buffer on a surface receiving the plurality of molded articles.

3. The molded article removing device according to claim 1, wherein the first removing member and the second removing member are made of aluminized steel.

4. The molded article removing device according to claim 1, further comprising:

a third drive mechanism configured to move the first removing member in the vertical direction, wherein the third drive mechanism moves the first removing member upward in the vertical direction so as to bring the first removing member toward the molding machine when the first removing member receives the plurality of molded articles from the removing unit of the molding machine.

5. The molded article removing device according to claim 1, further comprising:

a third drive mechanism configured to move the first removing member in the vertical direction, wherein the third drive mechanism moves the first removing member downward in the vertical direction so as to bring the first removing member toward the second removing member when the first removing member transfers the plurality of molded articles to the second removing member.

6. The molded article removing device according to claim 1, wherein the first drive mechanism is configured to move the first removing member in a horizontal direction to a position directly over the second removing member in a vertical direction.

7. The molded article removing device according to claim 1, wherein the first drive mechanism is configured to move linearly.

8. The molded article removing device according to claim 1, wherein the first removing member is configured to receive the plurality of the molded articles, and the second removing member is configured to receive the plurality of the molded articles from the first removing member.

9. A molding machine, comprising:

an injection molding unit, a temperature adjustment unit, a blow molding unit, a removing unit, a transporter configured to transport a plurality of molded articles from the injection molding unit, the temperature adjustment unit, the blow molding unit, and the removing unit, and the molded article removing device of claim 1.

10. The molding machine according to claim 9, wherein the transporter and the first removing member are separate components.

* * * * *